United States Patent
Hashimoto et al.

(10) Patent No.: US 7,079,669 B2
(45) Date of Patent: Jul. 18, 2006

(54) IMAGE PROCESSING DEVICE AND ELEVATOR MOUNTING IT THEREON

(75) Inventors: Manabu Hashimoto, Tokyo (JP); Kazuhiko Sumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 690 days.

(21) Appl. No.: 10/169,509

(22) PCT Filed: Dec. 27, 2000

(86) PCT No.: PCT/JP00/09319

§ 371 (c)(1),
(2), (4) Date: Jul. 3, 2002

(87) PCT Pub. No.: WO02/056251

PCT Pub. Date: Jul. 18, 2002

(65) Prior Publication Data

US 2002/0191819 A1    Dec. 19, 2002

(51) Int. Cl.
*G06K 9/00* (2006.01)
(52) U.S. Cl. .................... 382/118; 382/103; 382/106; 187/247
(58) Field of Classification Search ............... 382/118
See application file for complete search history.

(56) References Cited

U.S. PATENT DOCUMENTS 5,323,470 A * 6/1994 Kara et al. .................. 382/103
5,795,306 A   8/1998 Shimotani et al.
6,801,639 B1 * 10/2004 Nonaka et al. ............. 382/106

FOREIGN PATENT DOCUMENTS

| EP | 1 215 618 | 6/2002 |
|---|---|---|
| JP | 5-147835 | 6/1993 |
| JP | 6-1546 | 1/1994 |
| JP | 6-92563 | 4/1994 |
| JP | 11-268879 | 10/1999 |
| JP | 2000-193420 | 7/2000 |
| JP | 2000-211833 | 8/2000 |
| JP | 2000-259833 | 9/2000 |

* cited by examiner

*Primary Examiner*—Joseph Mancuso
*Assistant Examiner*—Damon M Conover
(74) *Attorney, Agent, or Firm*—Leydig, Voit & Mayer, Ltd.

(57) ABSTRACT

An image processing apparatus detecting a wheelchair passenger for an elevator. This image processing apparatus includes a TV camera installed so that a hail where passengers are waiting is monitored through the camera, which is located in the vicinity of the elevator door, a face area extraction unit, a wheelchair area estimation unit, and a wheelchair existence judgment unit. The image processing apparatus is operated in the following manner, one or a several passengers' face area is identified by the face area extraction unit in the image picked-up by the TV camera, and the position of the face area in the image is detected. If the passenger is sitting in a wheelchair, the area where the wheelchair is likely to be in the image is estimated by the wheelchair area estimation unit from the position of the face area. The estimated area where the wheelchair is likely to be is checked by the wheelchair existence judgment unit, to determine whether the wheelchair is present.

6 Claims, 17 Drawing Sheets

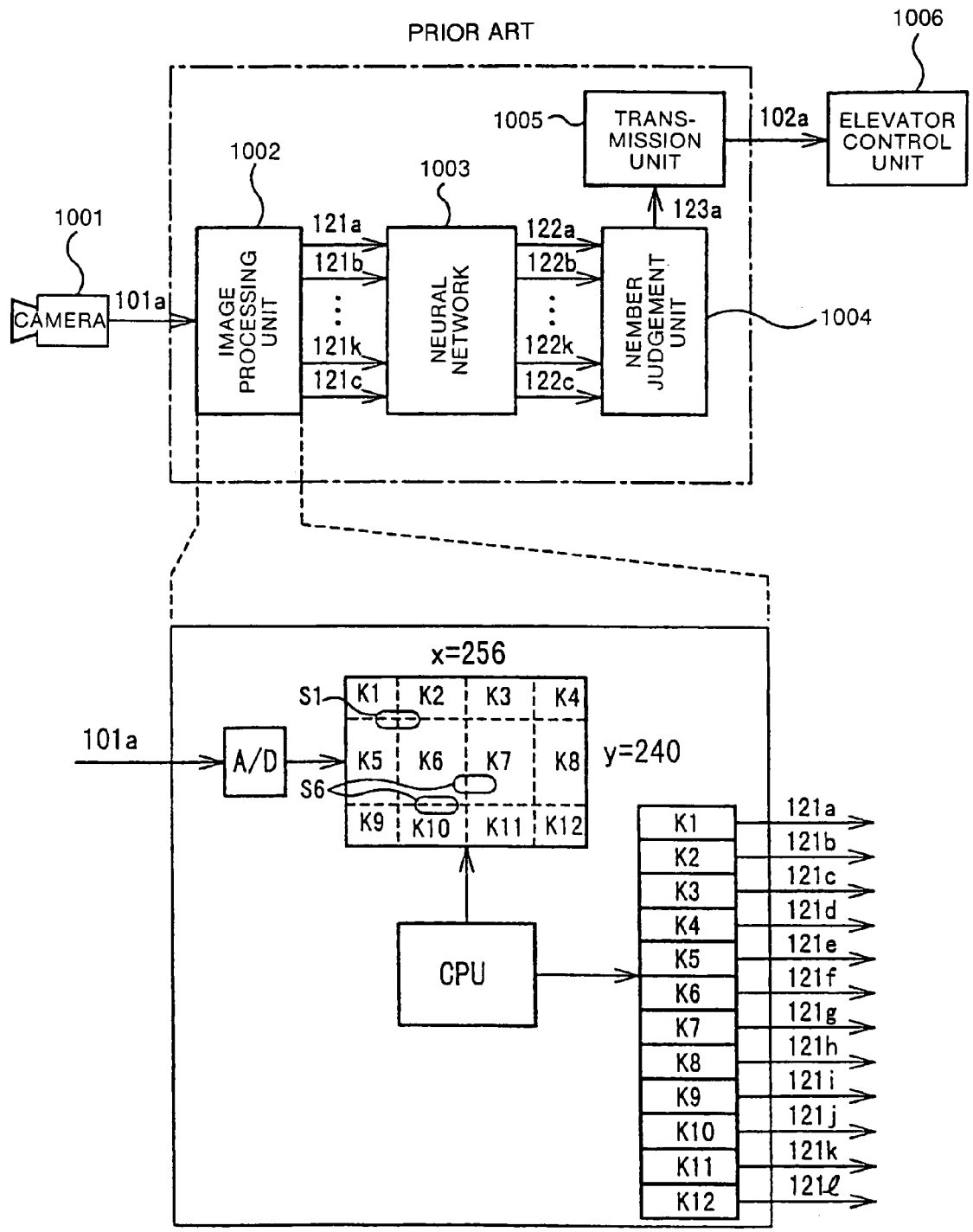

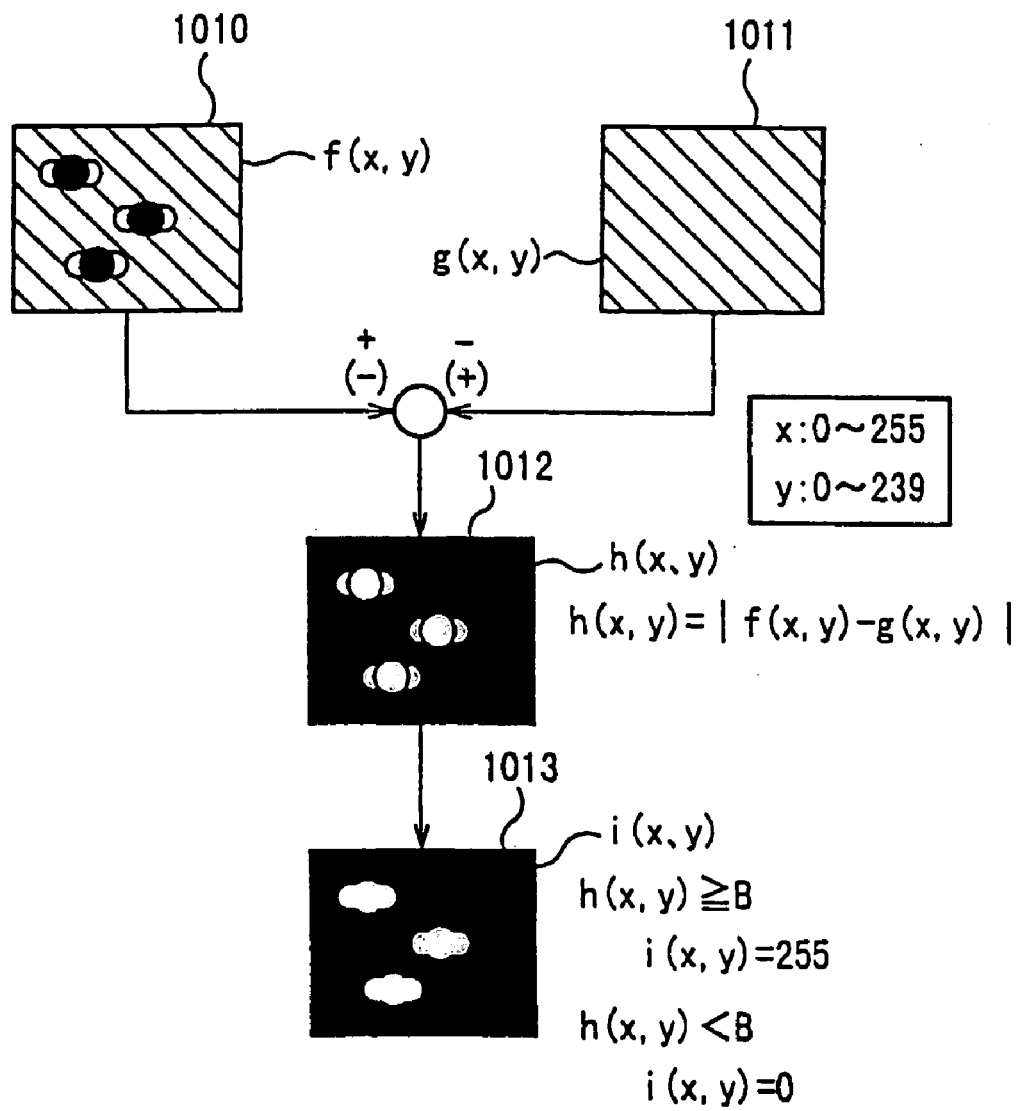

US 7,079,669 B2

IMAGE PROCESSING DEVICE AND ELEVATOR MOUNTING IT THEREON

TECHNICAL FIELD

This invention relates to an image processing apparatus which judges the condition of passengers of an elevator or the like, and an elevator provided with this image processing apparatus.

BACKGROUND ART

In the operation of the elevator, it is important to discriminate whether a passenger in an elevator car is a physically handicapped person using a wheelchair or an able-bodied person. The reason is that it becomes possible to provide safe use of the elevator to a passenger in a wheelchair, by changing an operation mode, such that when an ordinary able-bodied person is using the elevator, the operation mode is in a normal operation mode, and when a passenger in a wheelchair is using the elevator, it is changed to a wheelchair mode.

As the wheelchair mode, for example, the elevating speed of the car is made lower than the normal speed, and at the time of stopping on each floor, the landing accuracy of the car with respect to the hall floor is adjusted more precisely than the normal case. When the able-bodied is using the elevator, the elevating speed of the car is not made low, and the landing accuracy is not particularly increased, thereby the transit time of the elevator is reduced, and hence the operation efficiency can be improved.

It is necessary to automatically recognize whether a passenger in a wheelchair is trying to use the elevator, in order to automatically change the operation mode of the elevator depending on the kinds of the passenger.

Conventionally, no image processing device has been invented or developed for this purpose, and it is necessary for the passenger in a wheelchair to operate a push button dedicated to the wheelchair passenger by himself/herself, when he/she calls the car, or to operate the similar wheelchair button in the car after he/she enters into the car, to thereby give an instruction to change the operation mode with respect to the elevator system.

With regard to image recognition of the elevator passenger, for example, a measuring device of the number of waiting passengers is disclosed in Japanese Patent Application Laid-Open No. 6-92563. FIG. 16 and FIG. 17 are diagrams which explain the contents of the technique described in this publication.

FIG. 16 shows the configuration of a conventional number measuring device. In this figure, the device comprises a camera 1001, an image processor 1002, a neutral network 1003, a number judgment unit 1004, a transmission unit 1005, and an elevator control unit 1006. The TV camera is installed on the ceiling located above the waiting passengers' heads, and is directed vertically downwards.

At first, an image is picked up by the TV camera. The input image 1010 in FIG. 17 shows that three people can be seen. An image picked-up in the situation that there is no person, that is, a background image 1011 is prepared beforehand, and the input image is subjected to a differential processing, thereby a human area appears as a difference. An example of the differential image is shown in 1012 of FIG. 17. This is binarized to thereby clearly show the human area. The result of binarization is shown in 1013 of FIG. 17. The series of processing is executed by the image processor 1002.

Then, the binarized image is divided into twelve blocks, and the divided images are input to the neutral network 1003. The input data is processed by the neutral network which has performed learning beforehand, and an output signal is processed by the number judgment unit 1004, to thereby judge the number of passengers. This result is transmitted to the elevator control unit 1006 by the transmission unit 1005.

In the image processing device disclosed in the above publication, if a plurality of passengers is seen in an overlapped state, the image area corresponding to an individual passenger is not clearly separated, and in the binarized image, such a phenomenon appears that a plurality of passengers corresponds to one area. In the conventional art, the camera is installed overhead facing downwards in order to avoid this phenomenon. However, since there is such a problem in an elevator hall that installation of a camera on the ceiling increases the cost, there is a demand to install the camera in the elevator car or in the outer frame of the elevator door. That is, under a normal camera installation condition, there is a problem in that image recognition is likely to be failed, since the individual passenger area is not separated in the image.

Further, a method for extracting a face image to recognize an individual person is disclosed, for example, in Japanese Patent Application Laid-Open No. 2000-193420. It is described here that each position of eyes is detected from the feature of the ridge of the nose, but it is not to judge the condition of the person, that is, whether there is a wheelchair with this person.

In order to solve the conventional problems, it is an object of this invention to provide an image processing apparatus which judges the condition of a photographed individual, and more specifically to provide an image processing apparatus which can automatically recognize whether a passenger who is getting on the elevator sits on a wheelchair, and an elevator provided with this image processing apparatus.

In the invention of this application, after a face area is extracted from a photographed image, a second area assuming, for example, a wheelchair is extracted from this area to thereby judge the existence (condition) of a wheelchair.

DISCLOSURE OF THE INVENTION

The image processing apparatus according to the present invention comprises a face area extraction unit which extracts a first area including a person's face from a photographed person's image, a detection area estimation unit which estimates a desired detection area previously registered within the image using the area extracted by the face area extraction unit, and a judgment unit which judges whether an image in a second area extracted by the detection area estimation unit coincides with a previously registered condition. By this configuration, individual judgment of persons can be accurately performed based on the face area, and an information area which is desired to be known about each of the persons can be quickly extracted based on the information, to thereby obtain the person's information.

The image processing apparatus according to another invention comprises a TV camera installed so as to pick up an image of the outside of a compartment from the vicinity of a door which separates the inside and outside of the compartment, a face area extraction unit which detects the position of a person's face area from the image picked-up by the TV camera, a wheelchair area estimation unit which estimates an area corresponding to a wheel chair portion from the image using the extracted face area position when the person is assumed to be on a wheelchair, and a wheelchair existence judgment unit which judges whether a wheelchair exists from the image information for the estimated wheelchair area. By this configuration, the position of a passenger is estimated based on its face area, and the position at which the wheelchair should be located is estimated based on this position to perform image processing. Hence, the image processing area is defined, and whether a wheelchair exists is judged quickly and reliably.

The image processing apparatus further comprises a distance measurement unit which measures a distance up to the face area extracted by the face area extraction unit, and the wheelchair area estimation unit is configured so as to estimate a wheelchair area using the measured distance data, and hence the accuracy of judgment of existence of a wheelchair is improved. That is, at the time of detecting the position of a passenger's face, the height of the passenger's face portion from the floor is calculated by estimating the position of the passenger's face in the three-dimensional space. If the height is beyond a preset range, it can be clearly judged that the passenger is not sitting on a wheelchair. If it is within the range, an area where the wheelchair is likely to exist in the image is estimated when it is assumed that the passenger sits on a wheelchair, and the estimated area where the wheelchair exists is checked by the wheelchair existence judgment unit, to thereby judge if the wheelchair exists. Therefore, judgment accuracy is improved.

The distance measurement unit comprises an optical beam generation unit which generates a spot-like or slit-like optical beam, an optical beam scanning unit which scans so that the generated optical beam is projected to an area to be measured, and a reflected light detection unit which detects a reflected light of the scanned and projected optical beam. The distance measurement unit measures a distance up to an object based on a scanning angle of the optical beam and the position where the reflected light is detected. Hence, distance measurement becomes easily possible.

Further, the image processing apparatus comprises a range gate setting unit which sets a range threshold in order to judge that a person approaches a certain range from the compartment, and an image pickup timing determination unit which determines a timing at which an image is picked up through recognition by the distance measurement unit that a person comes into the range gate, in which an image is picked up by the TV camera according to the determined timing. Hence, the image is captured efficiently and reliably. Further, since an image is picked up at a point of time at which a range between a passenger approaching the camera and the camera is substantially constant, the passenger's face and the wheelchair can be picked up on the image in a substantially uniform size. Hence, the reliability of image recognition can be improved.

The elevator according to the present invention is an elevator provided with the image processing apparatus according to any one of the above inventions, a TV camera is the TV camera which picks up an image of a passenger from the vicinity of the elevator door, and information obtained by the wheelchair existence judgment unit is input into a control unit of the elevator. Hence, it becomes possible to change the operation condition of the elevator corresponding to the passenger, thereby a high-performance elevator capable of providing more comfortable operation can be provided.

BRIEF DESCRIPTION OF THE DRAWINGS

FIG. 16 and FIG. 17 are respectively a block diagram which explains the configuration of a number measuring device related to image recognition of elevator passengers in the conventional art, and a diagram which explains the processing procedure.

BEST MODE FOR CARRYING OUT THE INVENTION

Embodiments of this invention will now be explained with reference to the drawings.

First Embodiment

Figure 1:
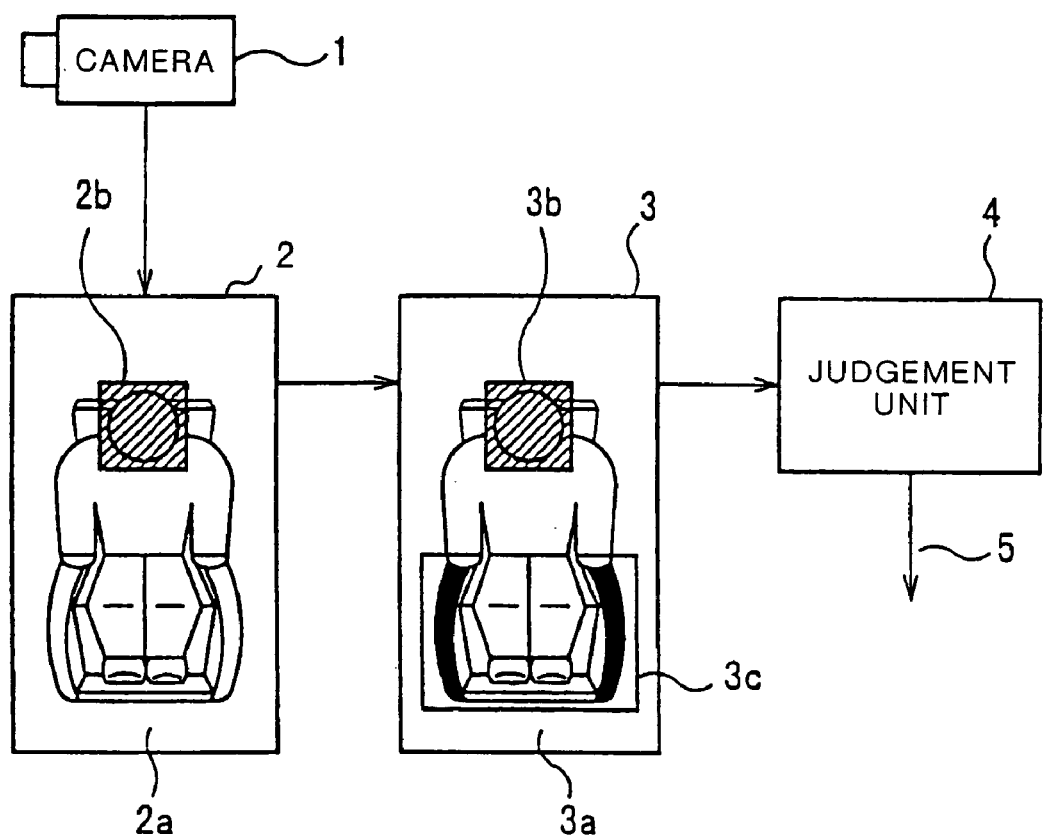
FIG. 1 and FIG. 2 are block diagrams which explain the configuration of an image processing apparatus according to a first embodiment of the present invention.
Figure 2:
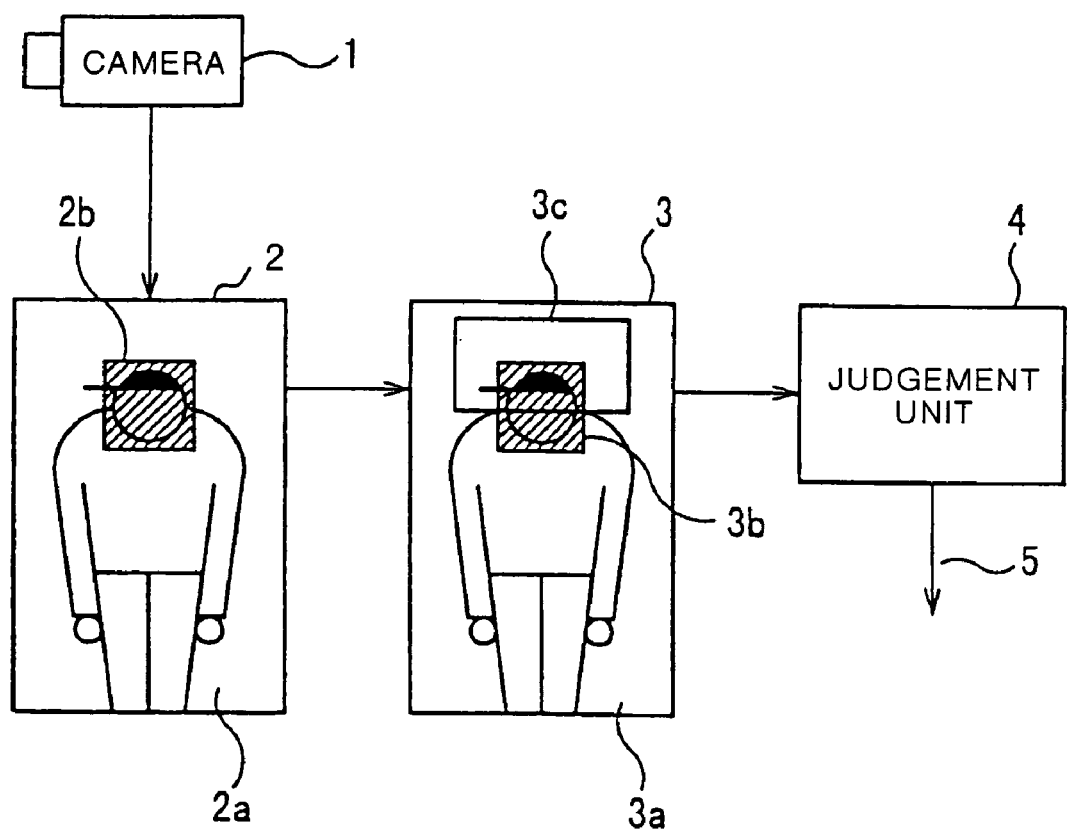
Figure 3:
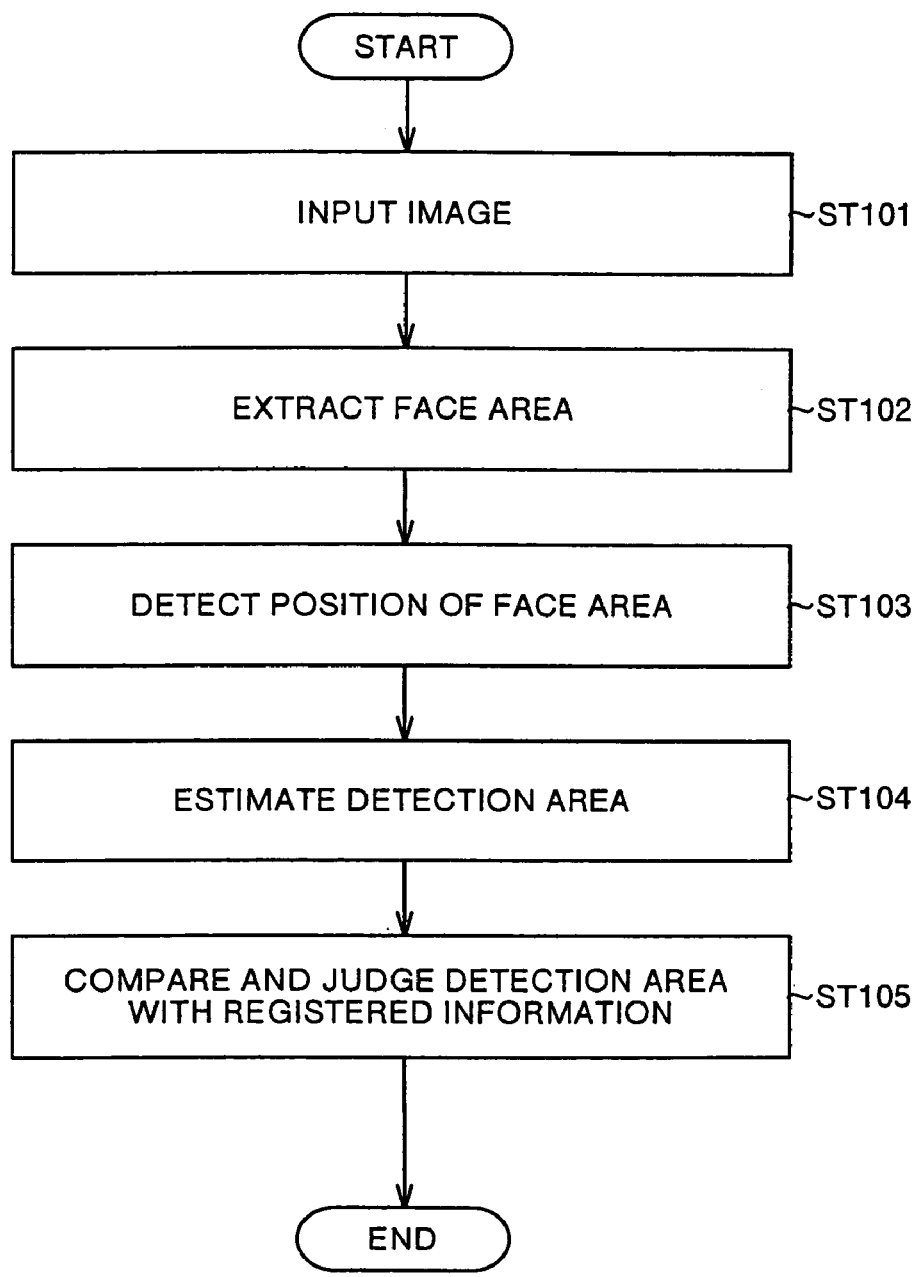
FIG. 3 is a flowchart which shows the operation flow of the image processing apparatus.

FIG. 1 and FIG. 2 are block diagrams which explain the configuration of an image processing apparatus according to a first embodiment of the present invention, and FIG. 3 is a flowchart which shows the operation flow of the image processing apparatus.

In these figures, reference numeral 1 denotes an image pickup device such as a TV camera, 2 denotes a face area extraction unit which extracts a face area 2b from a photographed picture 2a. 3 denotes a detection area estimation unit which estimates a detection area 3c registered beforehand, based on a photographed face area 3b (corresponding to 2b) portion of a photographed picture 3a (corresponding to 2a), 4 denotes a unit which judges by comparison between the image information of 3c and the preliminarily registered condition, and 5 denotes an output of the judgment result.

The image processing procedure will be explained below based on the flowchart in FIG. 3.

At first, in step 101 (hereinafter, described as ST101 in the figure), a grayscale picture is input from the TV camera. This picked-up picture is stored in a memory. In step 102, the face area extraction unit 2 extracts a human face area 2b in the picture 2a. As the human face area extraction algorithm, for example, an approach based on extraction of a flesh-colored portion in a color picture is used. When a plurality of persons exists in the visual field, a plurality of areas are extracted and output. The face area extraction unit 2 then continuously measures the position of the face area in step 103. In this embodiment, for example, the position of a representative point in the area is expressed by values of barycenter of the picture in the area.

In step 104, the detection area estimation unit 3 performs area estimation of a desired detection area based on the position of the extracted face area. In FIG. 1, a wheelchair area is extracted. An example of the estimation approach of the wheelchair area will be explained in detail. The width of the face area extracted by the face area extraction unit is measured. By comparing this width with the reference data related to the width of an ordinary human face, the distance of the face area from the camera can be estimated. It is possible to get to know a depression angle of the installed camera, that is, an angle between the optical axis of the camera and the horizontal line by measuring this depression angle at the time of installing the camera, and therefore the height of the face area from the floor is estimated using the distance of the face area from the camera and the depression angle of the camera. Further, it is possible to assume the position of the wheelchair to be located below by a certain distance with respect to the center of the passenger's face. The area where the wheelchair can exist in the picture can be set using these data.

In step 105, the estimated wheelchair area is searched, to judge if there is a wheelchair. The detection of the wheelchair is performed by using geometrical features of the wheelchair, such as the seat on which the passenger sits, and two wheels existing on the opposite sides thereof, and by color information and the like. The information can be used for comparison and judgment as preliminarily registered data.

When it is judged that a wheelchair exists within the area by the wheelchair judgment unit, it is judged that the passenger is sitting on the wheelchair, to thereby generate a wheelchair detection signal, and the series of processing is terminated.

The example explained above is provided to judge the existence of the wheelchair shown in FIG. 1, but this example is employed in the same manner as explained above for the judgment of existence of a hat on the head as shown in FIG. 2, for the purpose of security. In FIG. 2, the upper part of the face area 2b (3b) is further analyzed, and by comparing this part with the estimation of an ordinary head shape without wearing the hat, and also by the color information, it can be judged whether the passenger puts on a hat.

In the above embodiment, the example in which only one face area is extracted in the visual field of the TV camera has been explained. However, if there is a plurality of face areas, by repeating the steps of step 102 to step 105 for each face area in the same manner, judgment becomes possible.

In this embodiment, a barycentric position of the area is used as the face area position, but the center of a circumscribed quadrilateral of the face area may be used, or a characteristic portion in the face area, such as eyes or nose may be detected by detailed image processing to thereby calculate the representative position.

In this embodiment, the approach based on extraction of the flesh-colored area using a color picture has been explained for the face area extraction unit, but it is a matter of course that the same effect as that of this embodiment can be obtained by extracting the flesh-colored area by a pattern matching technique in which a monochrome picture is input to detect the face pattern including face parts such as eyes and nose.

Further, in this embodiment, as the wheelchair judgment unit, the approach which judges the existence of a wheelchair from its geometrical feature has been explained as one example. However, this embodiment can be executed also by performing judgment using other features within the wheelchair area. The features, such as the situation of the legs of the passenger who is sitting on the wheelchair, can help discrimination of a wheelchair passenger from pedestrian able-bodied people.

As explained in this embodiment, the person's face area is first extracted from an image including the person, a desired detection area is estimated and detected from the information of the face area, and then it is judged whether a wheelchair exists or the person puts on a hat. Hence, the processing speed is improved and the final judgment accuracy is also improved by sequentially cutting out only the necessary information from the image.

Second Embodiment

Figure 4:
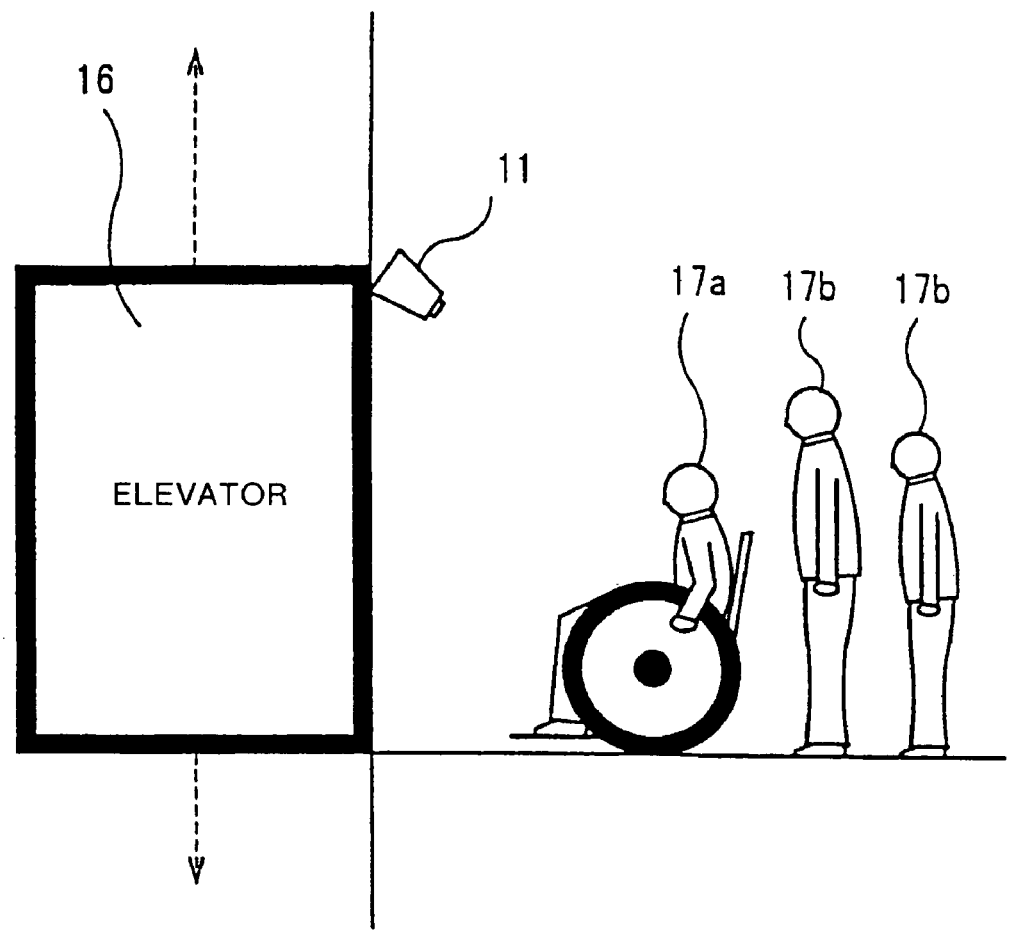
FIG. 4 is a diagram which explains an image processing apparatus according to a second embodiment of the present invention, and which shows the situation that three passengers are going to get on an elevator from outside.
Figure 5:
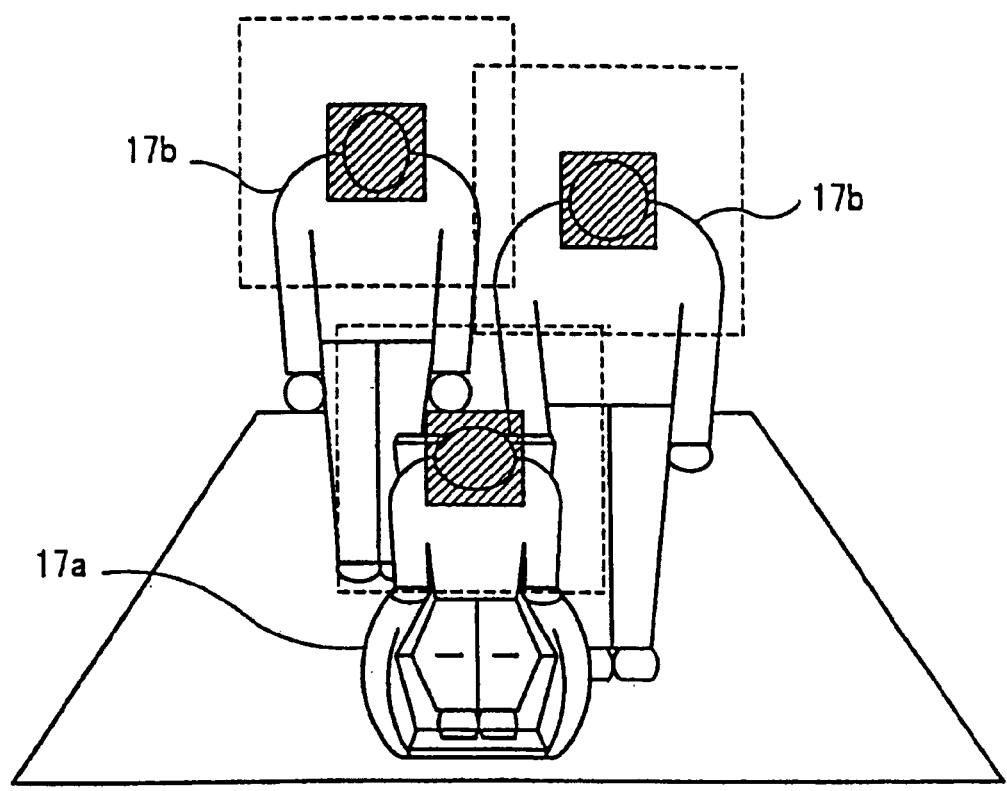
FIG. 5 is a schematic diagram which explains a subject image to be processed by the image processing apparatus according to the second embodiment, which is obtained by photographing the passengers in FIG. 4.
Figure 6:
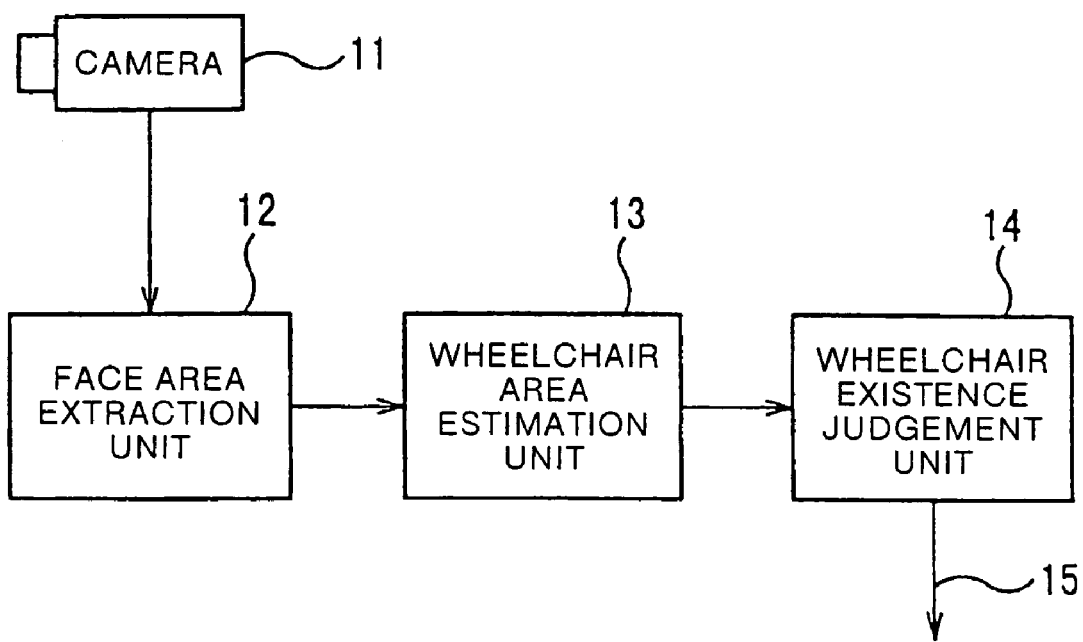
FIG. 6 is a block diagram which explains the configuration of the image processing apparatus according to the second embodiment.
Figure 7:
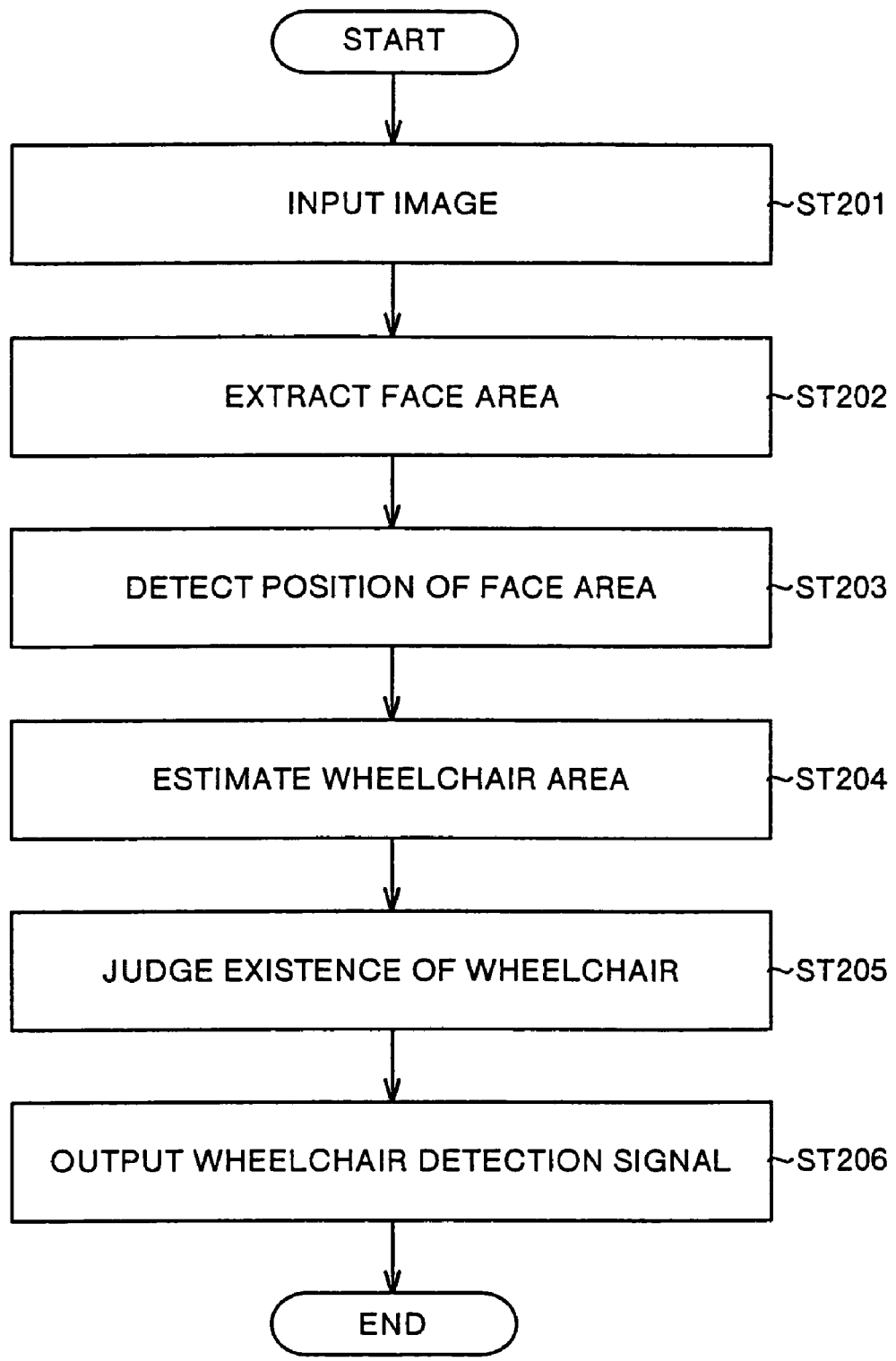
FIG. 7 is a flowchart which shows the operation flow of the image processing apparatus.

A second embodiment of the present invention will now be explained. FIG. 4 explains an image processing apparatus in one embodiment of the present invention, and schematically shows the situation that passengers are going to get on an elevator from outside when viewed from the side. FIG. 5 is a schematic diagram which explains a subject image to be processed by the image processing apparatus of this embodiment, which is obtained by photographing the state shown in FIG. 4 by a camera. FIG. 6 is a block diagram which explains the configuration of the image processing apparatus according to this embodiment, and FIG. 7 is a flowchart which shows the operation flow of the image processing apparatus.

In these figures, reference numeral 11 denotes a TV camera installed in the upper part of an external door of the elevator 16, which takes a picture of passengers 17a and 17b who are going to get on the elevator. For example, passengers are assumed to include the passenger 17a using a wheelchair and the passenger 17b who does not use a wheelchair. 12 denotes a face area extraction unit, 13 denotes a wheelchair area estimation unit, 14 denotes a unit which judges the existence of a wheelchair, and 15 denotes a wheelchair existence detection signal.

The operation of this image processing apparatus will be explained below based on the flowchart in FIG. 7. In step 201, a grayscale picture photographed by the TV camera 11 is input. The TV camera is installed on the upper part of the external frame of the external door, and the sight line thereof is directed to a direction so that the camera can catch whole passengers waiting for the elevator. The picked-up image is stored in an image memory. This image, that is, the picture photographed by the TV camera 11 in FIG. 4 is shown, for example, in FIG. 5.

In step 202, a human face area is extracted from the image by the face area extraction unit 12. As the human face area extraction algorithm, for example, an approach based on extraction of a flesh-colored portion in a color picture is used. When a plurality of people exists in the visual field, a plurality of areas are extracted and output. This corresponds to each hatched area in the respective areas indicated by dotted lines. Then, in step 203, the positions of the face areas are continuously measured. In this embodiment, the position of a representative point in each area is expressed by values of barycenter of the picture in the area, as in the first embodiment.

In step 204, the position of a wheelchair, at which the wheelchair is supposed to exist if the person is in a wheelchair, is estimated based on the extracted face area position using the wheelchair area estimation unit 13. As described in the first embodiment, this is performed by a method of measuring the width of the face area extracted by the face area extraction unit, or the like. Thereby, the distance of the face area from the camera can be estimated by comparing the distance with the reference data related to the width of an ordinary human face. It is possible to get to know a depression angle of the installed camera, that is, an angle between the optical axis of the camera and the horizontal line by measuring the angle at the time of installing the camera, and therefore the height of the face area from the floor is estimated using the distance of the face area from the camera and the depression angle of the camera. Further, it is possible to assume the position of the wheelchair to be located below by a certain distance with respect to the center of the passenger's face. The area in the picture in which the wheelchair possibly exists can be set using these data.

In step 205, the wheelchair existence judgment unit 14 searches the estimated wheelchair area to thereby judge if there is a wheelchair. The detection of the wheelchair is performed by using geometrical features of the wheelchair, such as the seat on which the passenger sits and two wheels existing on the opposite sides thereof, and by using color information and the like.

Particularly, the details of judgment of existence of a wheelchair using the grayscale picture will be explained next.

In order to judge the existence of a wheelchair, a learning pattern is created beforehand, and a lot of learning data is prepared. The learning data is image data including a wheelchair photographed in the picture, and a lot of data is prepared by changing passengers' clothes, types of the wheelchair, time of photographing or the like in various ways. A plurality of images of the area in the vicinity of the legs of passengers in wheelchairs are cut out from these learning images, and are rearranged to one-dimensional signals in accordance with a certain rule (for example, raster scanning), and plotted on a multi-dimensional space, wherein the luminance of each pixel is designated as a value of each axis. The areas consisting of plot point groups corresponding to the plurality of these images including the wheelchair are designated as learning point groups including a wheelchair.

The procedure of judging the existence of a wheelchair by using this learning pattern will now be explained. An area in which a wheelchair will exist is extracted based on the face image area information. In the same manner as for the learning data creation, the extracted image area is plotted in the same multi-dimensional space. This is an unknown data point. Then, the distance between the unknown data point and each point constituting the plurality of learning point groups is respectively calculated, and is compared with a preset threshold. If there are the unknown data and a learning data point existing within the range below the threshold, this unknown data is judged to include a wheelchair.

In step 206, if it is judged that a wheelchair exists in the area by the wheelchair judgment unit, it is judged that the passenger is sitting on the wheelchair, and a wheelchair detection signal is generated, thereby the series of processing is terminated.

In this embodiment, an example has been explained in which only one face area is extracted in the visual field of the TV camera. However, if there is a plurality of face areas, by similarly repeating the steps of step 202 to step 206 for each face area, it can be recognized if each of the plurality of passengers approaching the elevator car is sitting on the wheelchair.

As explained in the first embodiment, the center of a circumscribed quadrilateral of the face area may be used as the face area position, or a characteristic portion in the face area such as eyes or nose may be detected through further specific image processing to thereby calculate the representative position.

Further, as explained in the first embodiment, it is a matter of course that the similar effect to that of this embodiment can be obtained by using the pattern matching technique, for the face area extraction unit, in which a monochrome picture is input to detect the face pattern including face parts such as eyes and nose.

As explained in the first embodiment, as the wheelchair judgment unit, the approach of judging the existence of a wheelchair from a geometrical feature has been explained as one example. However, this embodiment can be executed also by performing judgment using other features within the wheelchair area, which can discriminate the wheelchair passenger from pedestrian able-bodied people, such as the situation of the legs of a passenger who is sitting on the wheelchair.

As shown in this embodiment, in the process during which the elevator car arrives and is landed and passengers waiting for the car in the elevator hall get on the car, the image of the passenger can be obtained one by one in the state without being concealed by other people. Hence, stable image recognition becomes possible. Further, in the recognition, passenger's position is estimated based on the face area, which is the area at a high position unlikely to be concealed by other people, and the position of a wheelchair is also estimated, to thereby define the image processing area. Thereby, there is the effect that the wheelchair existence judgment can be stably performed.

Third Embodiment

A third embodiment of the present invention will now be explained. This embodiment has such a configuration that a distance measurement unit which measures the distance up to a subject image is added to that of the second embodiment in addition to the camera which picks up the image provided therein.

Figure 8:
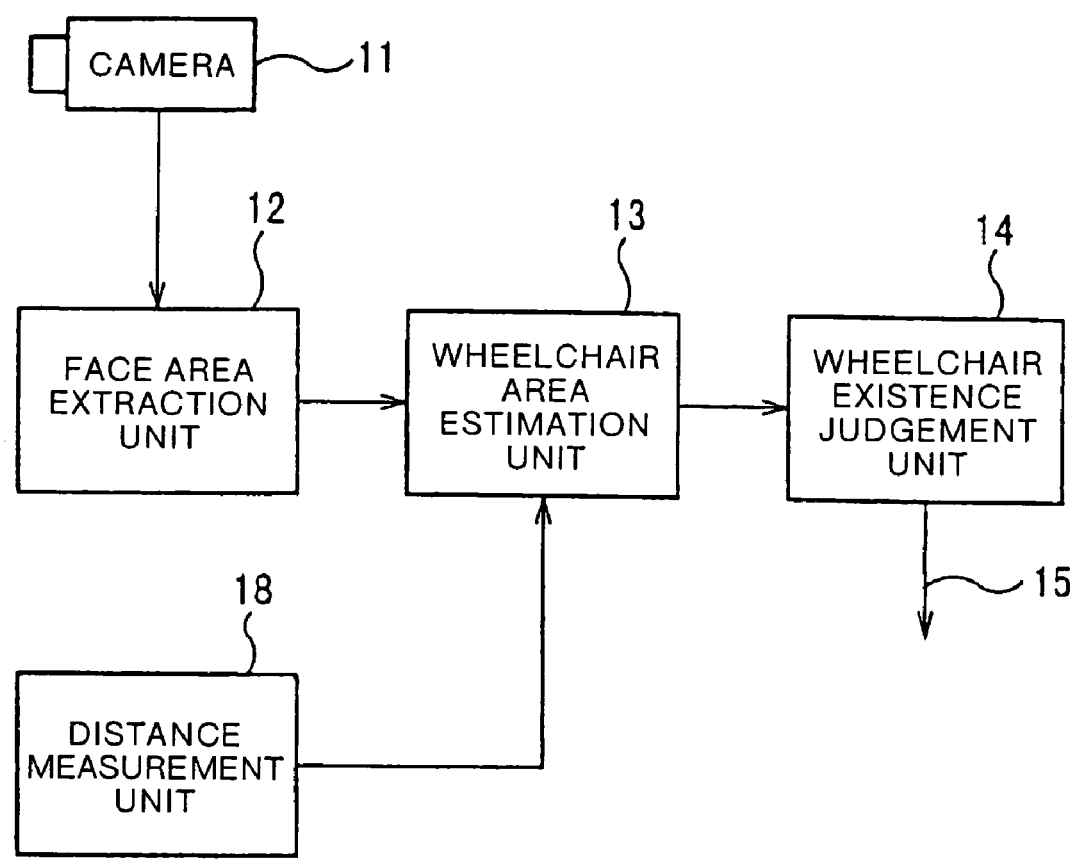
FIG. 8 is a block diagram which explains the configuration of an image processing apparatus according to a third embodiment.
Figure 9:
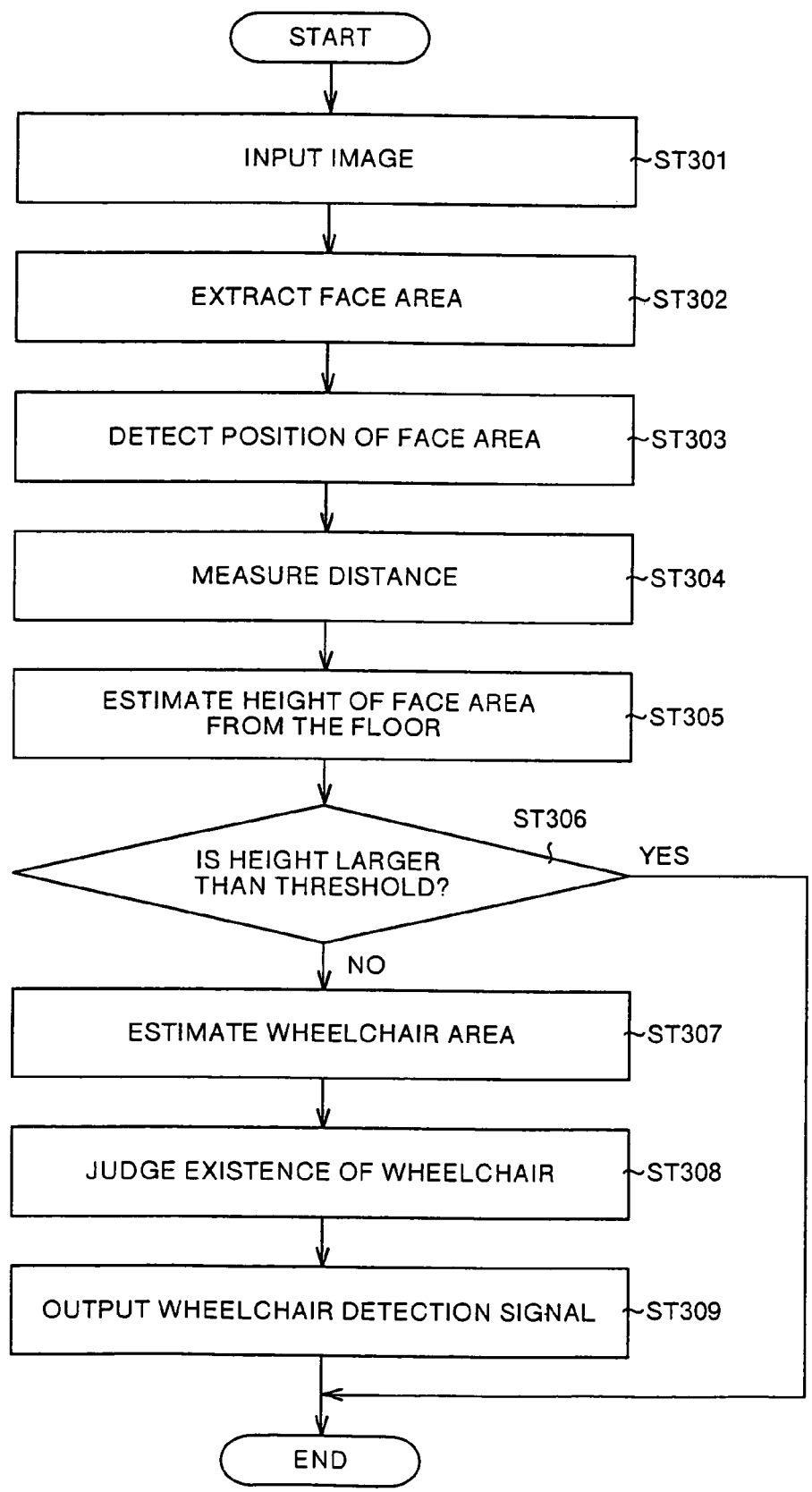
FIG. 9 is a flowchart which shows the operation flow of the image processing apparatus.

FIG. 8 is a block diagram which explains the configuration of an image processing apparatus according to this embodiment, and FIG. 9 is a flowchart which shows the operation flow of the image processing apparatus.

In the figures, reference numerals 11 to 15 are the same as those in the second embodiment. Reference numeral 18 denotes the distance measurement unit. Though not shown, the distance measurement unit in this embodiment is an example based on a method for analyzing a stereo image using a twin-lens TV camera.

The operation procedure will be explained with reference to FIG. 9. Since steps 301 to 303 are the same as those in the first embodiment, the steps will be explained briefly. At first, the face area is extracted in step 302 based on the image input by the TV camera in step 1, and the position of the face area is detected using a barycentric method or the like in step 303. Since the TV camera is a twin-lens reflex camera, the processing in step 301 to step 303 is carried out respectively based on the images of the respective cameras.

In step 304, distance measurement is executed by the distance measurement unit 18. In this embodiment, a twin-lens stereo method is employed as a distance measurement method. That is, as the TV camera, two TV cameras whose geometrical position is known are disposed, and by obtaining the correspondence between respective pixels of the image captured by each camera, a distance distribution of the object is measured using the principle of triangulation. The distance distribution is stored as a distance image in which the distance from the camera to the object is stored in each pixel.

In step 305, the height of the face area from the floor is calculated by the wheelchair area estimation unit 13 from the position of the extracted face area in the image and the distance measurement result corresponding to the face area. In this embodiment, a positional relation between the gray-scale picture obtained by the TV camera and the distance image is previously made through the calibration operation. Since the depression angle of the TV camera is known as in the second embodiment, the three-dimensional position of the face area is identified by combining this depression angle with the distance data from the camera to the face area. As a result, the height of the face area from the floor is calculated.

In step 406, the wheelchair area estimation unit 13 compares the measured height of the face area from the floor with the preset threshold. In this embodiment, this threshold is set as an average value between the height of the face when ordinary adults are standing and the height of the face when the adults are sitting on wheelchairs. If the height of the face area from the floor is larger than the threshold, it is judged that the face area is of a standing passenger, and therefore the wheelchair detection processing is not performed to end the processing. However, if the height of the face area from the floor is smaller than the threshold, it is judged that the face area is quite possible to be of a wheelchair passenger, and therefore control proceeds to step 307, where the position on the image at which the wheelchair may exist is estimated.

In step 308 and step 309, the wheelchair existence judgment unit 14 judges whether a wheelchair exists by performing detailed investigation with respect to the estimated wheelchair area, and when it is judged that a wheelchair exists, the wheelchair existence judgment unit 14 generates a wheelchair detection signal. These operations are the same as those of step 205 and step 206 in the second embodiment.

In this embodiment, the twin-lens stereo method is used for the distance measurement unit 18. However, the similar effect can be obtained by using other distance measuring approaches having a function of measuring the distance of the extracted face area from the camera, such as a distance measuring approach using a camera having three or more lenses, or a distance measuring approach in which the distance is measured based on a blurred picture by a single-lens camera.

In this embodiment, there is shown an example of once forming a data structure in which a distance image, i.e., each pixel includes distance information from the camera. However, the distance data needs only to include the information corresponding to a representative position of the extracted face area, and therefore the similar effect can be obtained, for example, by dividing the visual field of the TV camera into a plurality of blocks and installing a plurality of distance measuring sensors of a spot light irradiation type which measures the distance of the face area from the camera with respect to the central portion of each block, or by providing a plurality of ultrasonic sensors having a narrow directivity.

As shown in this embodiment, accurate estimation of the wheelchair area can be performed by accurately judging the three-dimensional position of a passenger, and as a result, the reliability in judging that the passenger is a wheelchair passenger can be improved.

Fourth Embodiment

A fourth embodiment of the present invention will now be explained.

Figure 10:
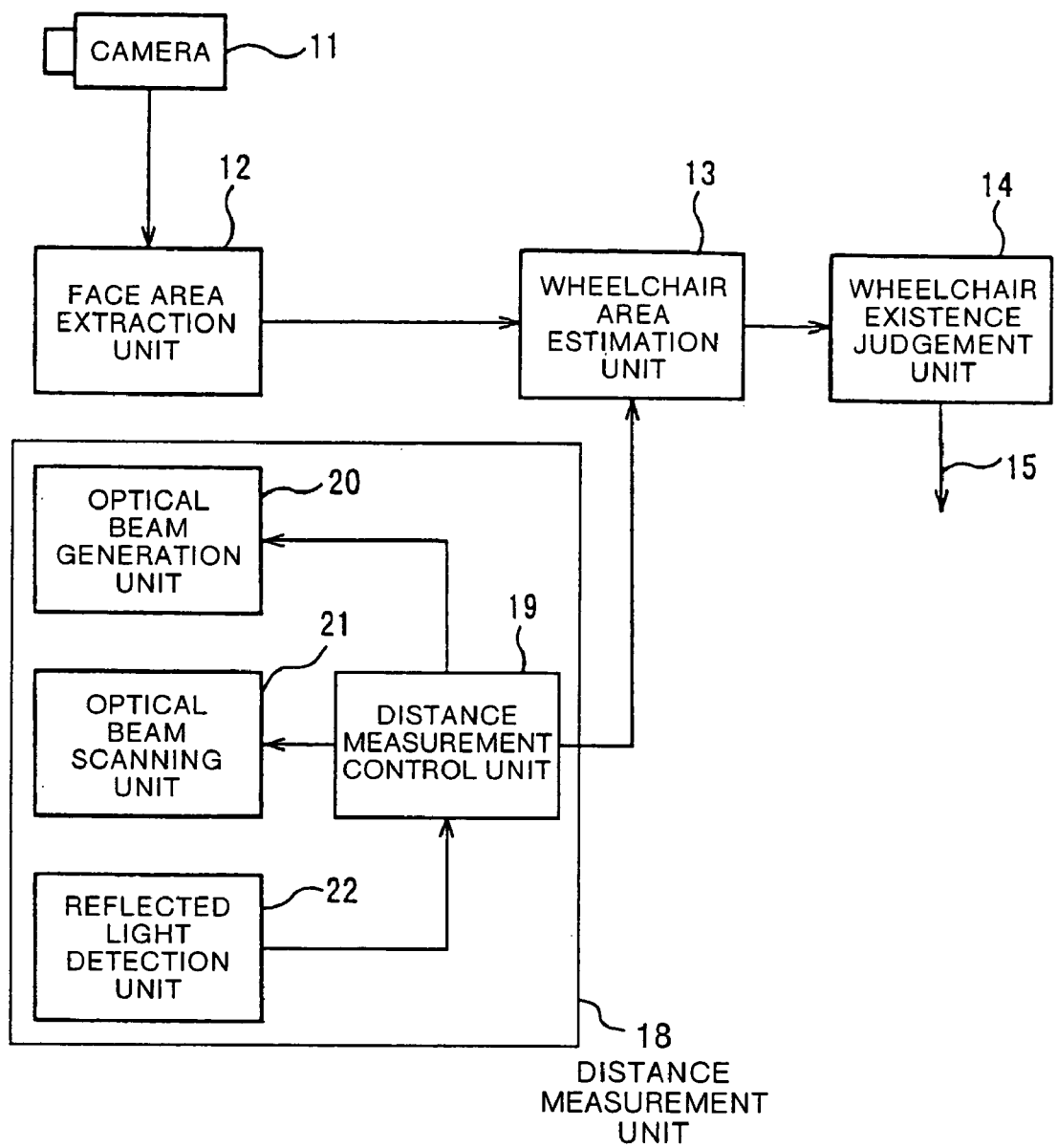
FIG. 10 is a block diagram which explains the configuration of an image processing apparatus according to a fourth embodiment.
Figure 11:
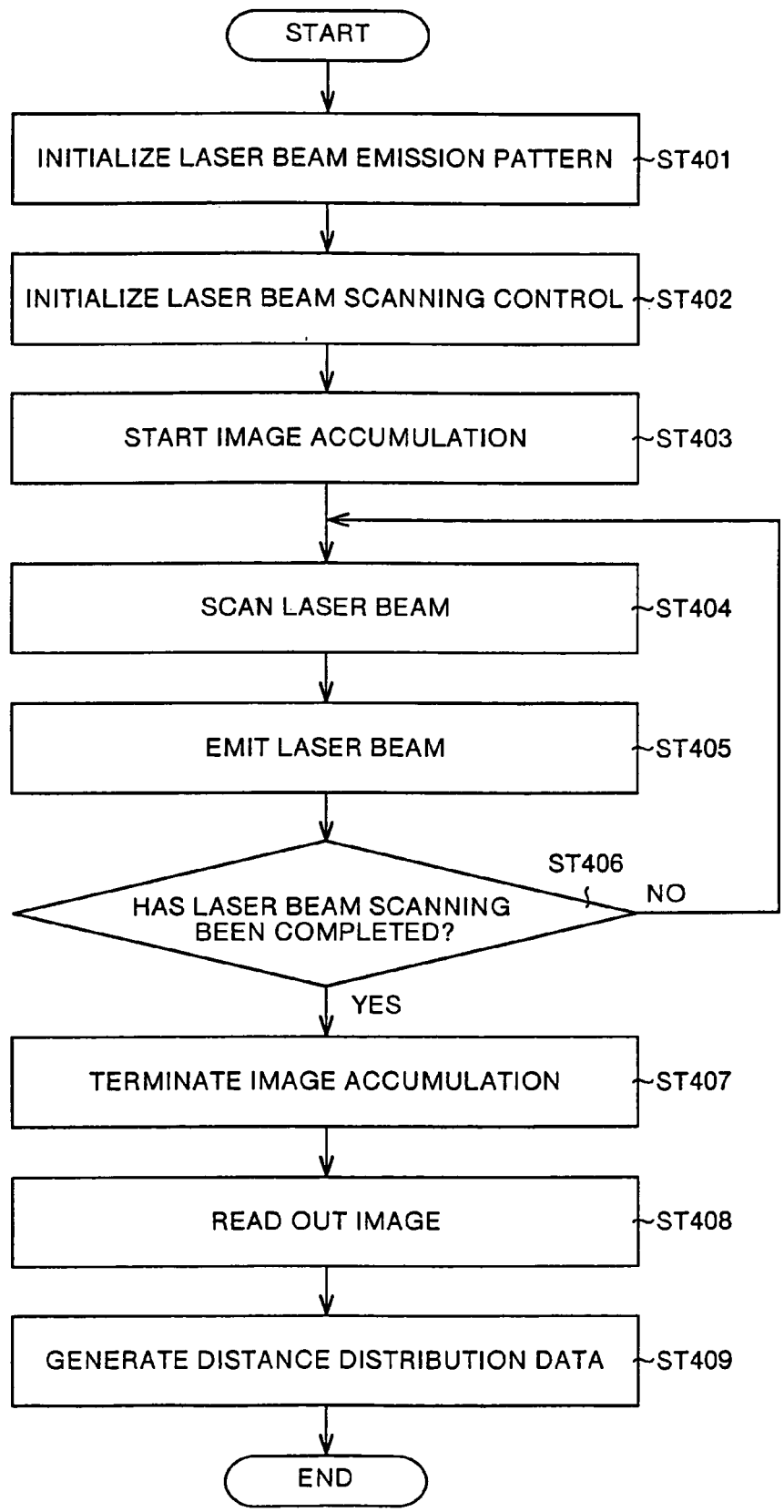
FIG. 11 is a flowchart which shows the operation flow of the image processing apparatus.

FIG. 10 is a block diagram which explains the configuration of an image processing apparatus according to this embodiment, and FIG. 11 is a flowchart which shows the operation flow of the image processing apparatus. This fourth embodiment is related to an image processing apparatus which uses a laser ranging sensor as the distance measurement unit in the third embodiment.

In the figures, reference numerals 11 to 15 are the same as those in the second and third embodiments. Reference numeral 19 denotes a distance measurement control unit, 20 denotes an optical beam generation unit, 21 denotes an optical beam scanning unit and 22 denotes a reflected light detection unit.

The operation will be explained with reference to the flowchart in FIG. 11. FIG. 11 shows another embodiment related to the step 304 in FIG. 9. Hence, START in FIG. 11 indicates the step following step 303 in FIG. 9, and END in FIG. 11 will proceed to step 305 in FIG. 9. An image is first input by the TV camera 11, and the face area extraction unit 12 extracts a human face area from the image and measures the position of a representative point in the face area.

Subsequently, the distance measurement after step 401 and on is performed. The distance measurement control unit 19 is a unit which controls the optical beam generation unit 20, the optical beam scanning unit 21, and the reflected light detection unit 22. The principle of distance measurement shown in this embodiment is to emit a slit-type laser beam, pick up the image of the beam which hits an object and returns by a camera, and measure the distance based on the principle of triangulation, and it is referred to as a light-section method. The optical beam generation unit 20 consists of a semiconductor laser light emission element and a lens, in which excited and output laser beams are once converged and the converged beam is further deformed into a slit by a cylindrical lens to generate the slit-like beam. In the first step 401 for the distance measurement, the emission pattern of the laser beam is initialized by the distance measurement control unit 19. The emission pattern indicates a pattern in which a light is turned on or off synchronously to the scanning unit, when laser slit beams are scanned. In this embodiment, such a light emission pattern that a light is turned on momentarily and is turned off in other periods in scanning for one screen is initialized so that a plurality of patterns are generated in which the lighting timing is variously changed.

In step 402, the optical beam scanning unit 21 initializes the control pattern for the laser beam scanning. This intends that the scanning speed and range are initialized so that the optical beam scanning unit scans in synchronization with image capturing timing.

In step 403, image accumulation is started by a CCD camera which is the reflected light detection unit 22. In step 404, a galvano-mirror which is the optical beam scanning unit 21 starts the operation according to the initialized pattern, and in step 405, the optical beam generation unit 20 controls ON/OFF of the beam according to the initialized pattern. In step 406, it is judged whether the laser beam scanning has been finished. If it has not been finished, the operations in steps 404 to 405 are repeated, and if it has been finished, the image accumulation by the reflected light detection unit 22 is terminated in the next step 407.

In step 408, the accumulated image of the laser beam reflected light is read out and a position of the image is measured through image processing. The three-dimensional position, i.e., the distance at the position on the object to which the optical beam has been projected is measured, based on the principle of triangulation, from the position of the reflected light of the beam on the detected image and the scanning angle of the optical beam scanning unit 21 at the time when the laser beam is turned ON. Then in step 409, the measured distance is stored in the memory of the distance measurement control unit 19 as the distance data.

In this embodiment, the light emission pattern is set so that the slit-like laser beam scanned during the image accumulation period for one image of the CCD camera that is the reflected light detection unit, is turned ON only once. Hence, a distance distribution for one line in the longitudinal direction in the image accumulation for one image can be measured. Therefore, by repeating operations in steps 403 to 409 while changing the time when the beam is turned ON, laser beams can be irradiated to various positions, and the distance at the irradiated position can be measured. As a result, in step 409, the distance image can be obtained. The steps for distance measurement are now completed.

The operation in this embodiment is followed by operations as shown in steps 305 to 309 in FIG. 9. That is, the wheelchair area estimation unit 13 calculates the height of the face area from the floor from the position in the image of the extracted face area and from the result of distance measurement result corresponding to the face area. Similarly, the wheelchair area estimation unit 13 compares the height of the measured face area from the floor with the preset threshold to perform rough judgment related to the existence of a wheelchair. If the height of the face area from the floor is smaller than the threshold, it is judged that the face area is quite possible to be of a wheelchair passenger, and the position in the image where the wheelchair may exist is estimated. In the end, the wheelchair existence judgment unit 14 performs detailed investigation for the estimated wheelchair area, and judges the existence of a wheelchair and when it is judged that there is a wheelchair, the wheelchair existence judgment unit 14 generates a wheelchair detection signal.

In this embodiment, the approach of generating distance images repeatedly while changing light emitting timings has been explained based on the light-section method for emitting one laser slit beam during the accumulation period of one image by the CCD camera that is the reflected light detection unit, as the distance measurement unit composed of the optical beam generation unit, the optical beam scanning unit, and the reflected light detection unit. However, the similar effect can be obtained by using a spatial coding method for projecting a plurality of laser slit beams during the accumulation period of one image by the CCD camera.

In this embodiment, the example in which the galvano-mirror is employed as the optical beam scanning unit 21 is explained. However, a polygon mirror of a polygonal pillar type may be used.

As shown in this embodiment, there is the effect that stable distance measurement can be performed without being influenced by the existence or the complexity of a pattern in the clothes that the passenger wears, by using the distance measurement unit which projects the optical beam.

Fifth Embodiment

A fifth embodiment of the present invention will now be explained.

Figure 12:
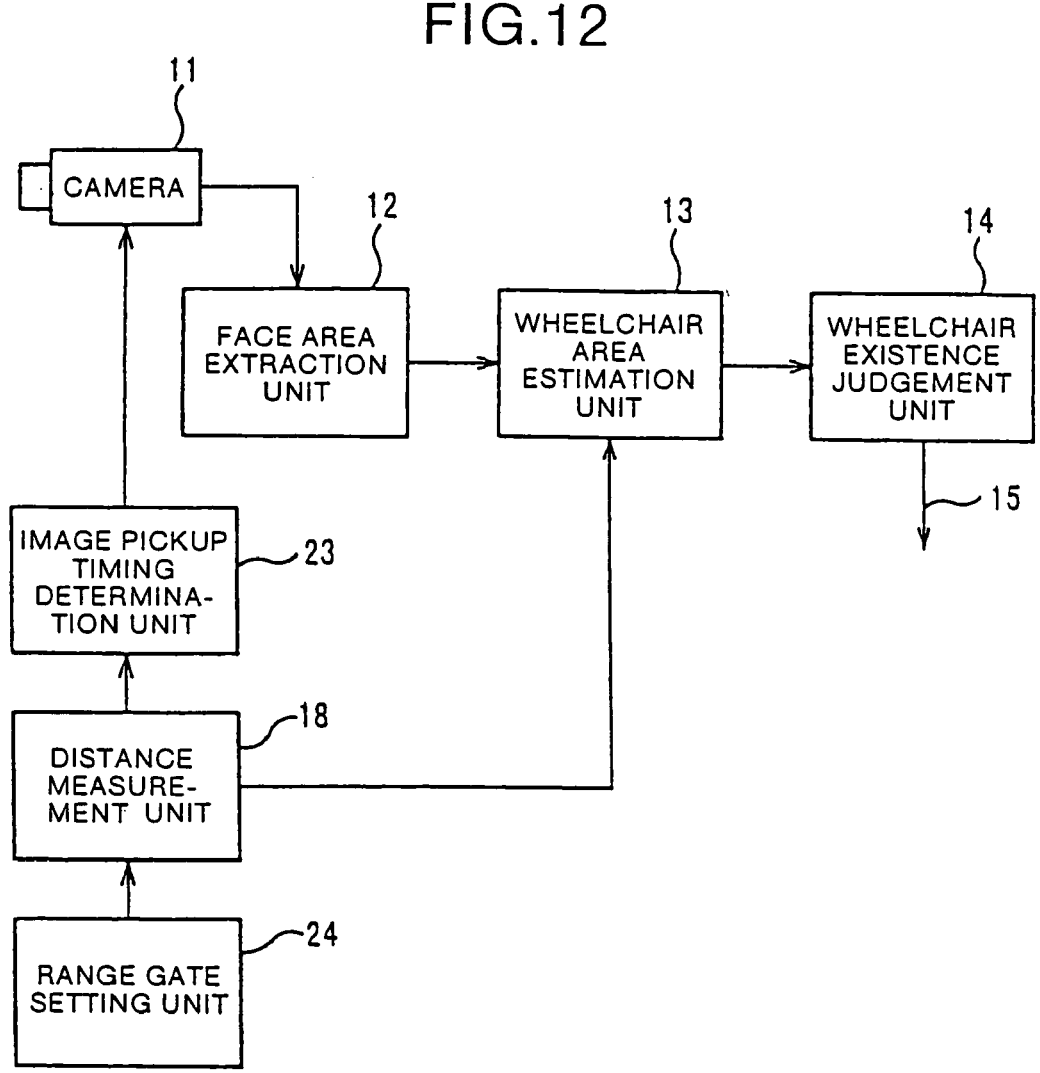
FIG. 12 is a block diagram which explains the configuration of an image processing apparatus according to a fifth embodiment.
Figure 13:
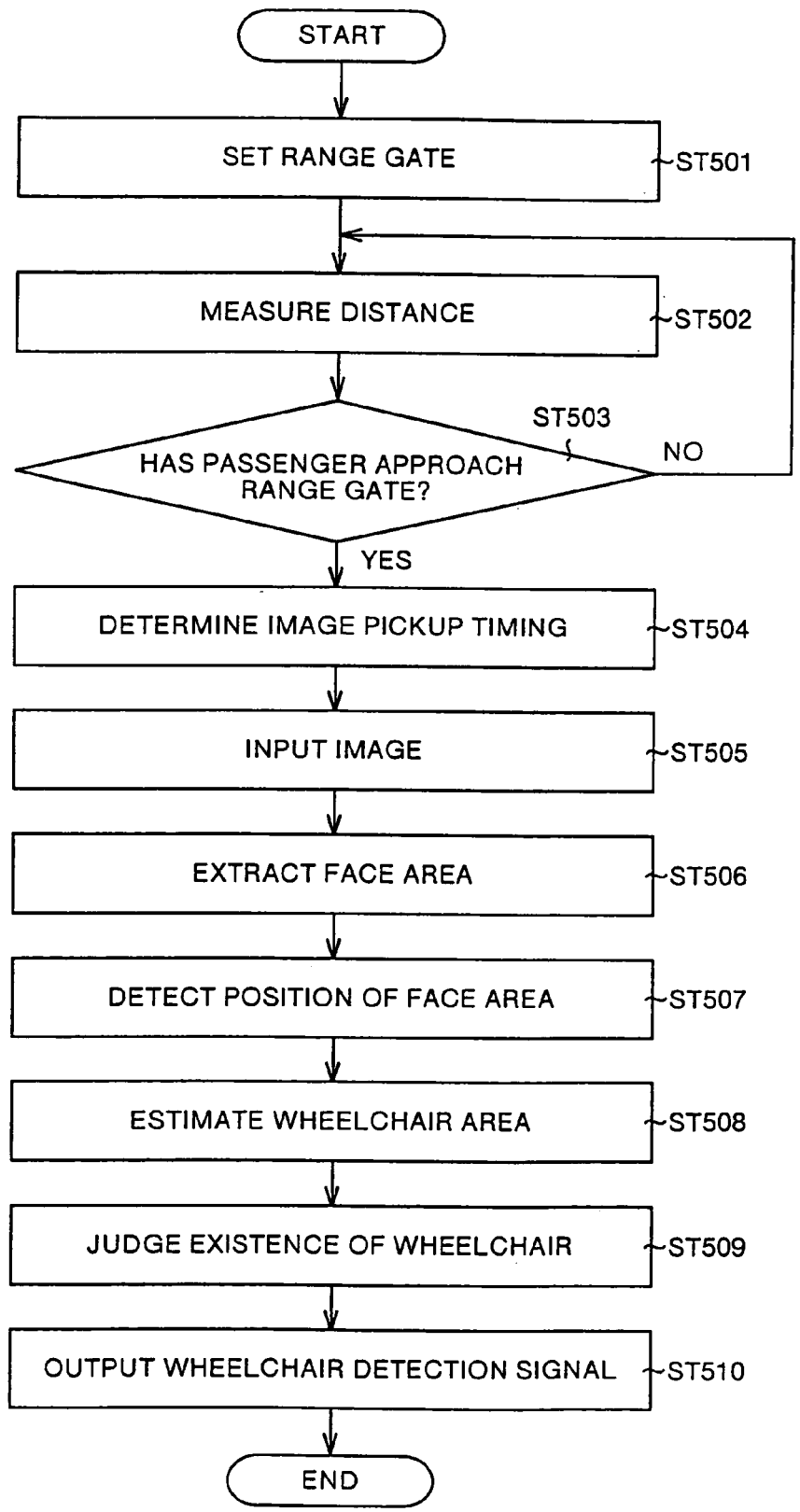
FIG. 13 is a flowchart which shows the operation flow of the image processing apparatus.

FIG. 12 is a block diagram which explains the configuration of an image processing apparatus according to this embodiment, and FIG. 13 is a flowchart which shows the operation flow of the image processing apparatus.

In the figures, reference numerals 11 to 15 and 18 are the same as those in the second to fourth embodiments. 23 denotes an image pickup timing determination unit, and 24 denotes a range gate setting unit.

This embodiment will be explained based on the flowchart in FIG. 13.

At first, in step 501, a range gate is set by the range gate setting unit 24. The range gate stands for a threshold related to a distance between the TV camera 11 and a passenger when the passenger approaches the elevator car when its door opens. For example, the distance between the camera and the passenger required to pickup an image of the passenger's face area in a desired size by the TV camera 11 is examined beforehand and designated as the threshold.

In step 502, the distance between the camera and the passenger is measured by the distance measurement unit 18. As a distance measuring approach, for example, the approach explained in the third or fourth embodiment is employed.

In step 503, the measured distance between the camera and the passenger is compared with the preset range gate threshold. If the distance between the camera and the passenger has not reached the range gate, the distance between the camera and the approaching passenger is measured again in step 502. If the distance between the camera and the passenger has reached the range gate, the timing when the image is picked up is determined by the image pickup timing determination unit 23 in step 504. This timing is determined so that the size of the face area of the imaged person in the picked-up image is close to the preset value.

In step 505, the image of the passenger is picked up by the TV camera 11. In step 506, the face area is extracted by the face area extraction unit 12 and the position of a representative point in the face area is detected in step 507. In step 508, an area where a wheelchair may exist is estimated based on the position of the face area extracted by the wheelchair area estimation unit 13. The operation of the wheelchair area estimation unit is the same as that explained in the second embodiment.

In step 509, the inside of the estimated wheelchair area is image-processed and the existence of a wheelchair is judged by the wheelchair existence judgment unit 14. As a result, if it is judged that there is a wheelchair, a wheelchair detection signal 15 is output in step 510, and the series of operation is finished.

In this embodiment, there has been explained the approach shown in the second or third embodiment as the distance measurement unit. However, this unit needs only to be a sensor having a function to find that the passenger has approached the camera within a certain range, and needless to say, the similar effect can be exerted by using, for example, a photoelectronic sensor, an ultrasonic sensor, or a pyroelectric human sensible sensor.

In this embodiment, the approach which is used only for comparison of the output of the distance measurement unit with the range gate set in advance has been explained. However, if any unit which can obtain a distance image is employed as the distance measurement unit, it is also possible by a device having the same configuration as that in FIG. 12, to increase the reliability of the wheelchair area estimation by determining the distance of the face area extracted by the face area extraction unit from the cameras, as shown in the embodiment related to the second invention.

As shown in this embodiment, images can be picked up at a point of time at which the distance between a passenger approaching the camera and the camera is substantially constant. Therefore, the passenger's face and the wheelchair can be picked up substantially in a uniform size on the image, and hence there is the effect that the reliability of image recognition can be improved.

Sixth Embodiment

A sixth embodiment of the present invention will now be explained. This embodiment relates to an elevator apparatus provided with the image processing apparatus of the above-described second to fifth embodiments, in which the wheelchair existence judgment signal output in the above embodiments is input to the control unit of the elevator to thereby control the operation of the elevator.

Figure 14:
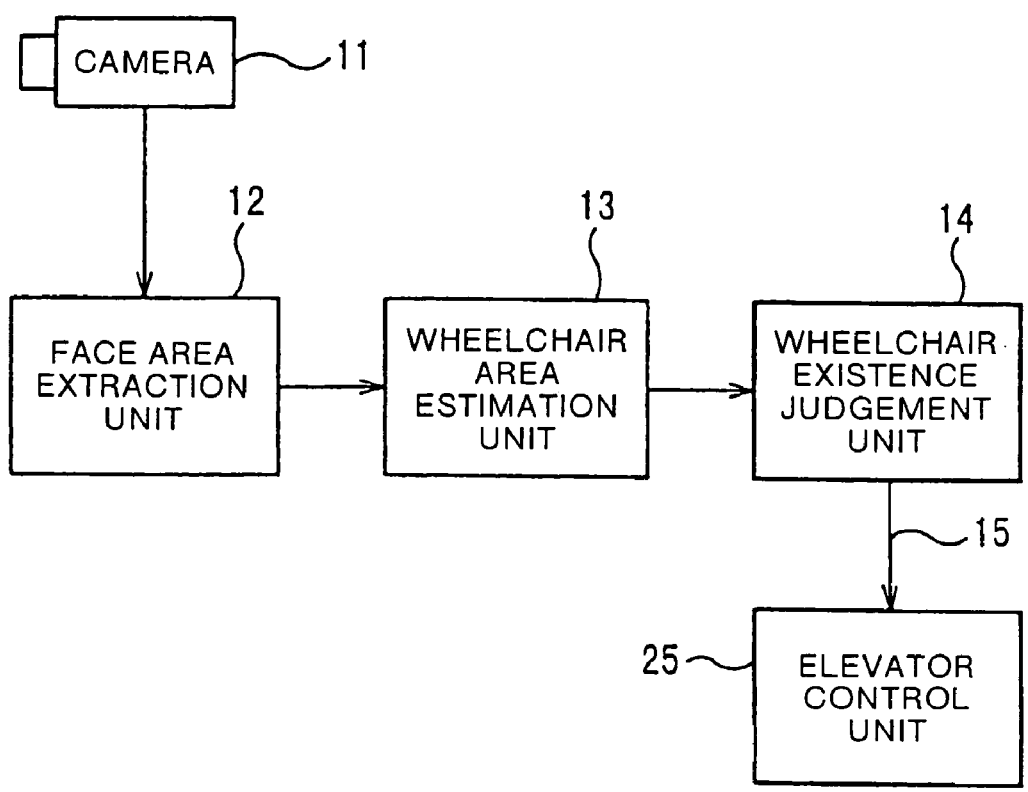
FIG. 14 is a block diagram which explains the configuration of an image processing apparatus according to an other embodiment of the present invention.
Figure 15:
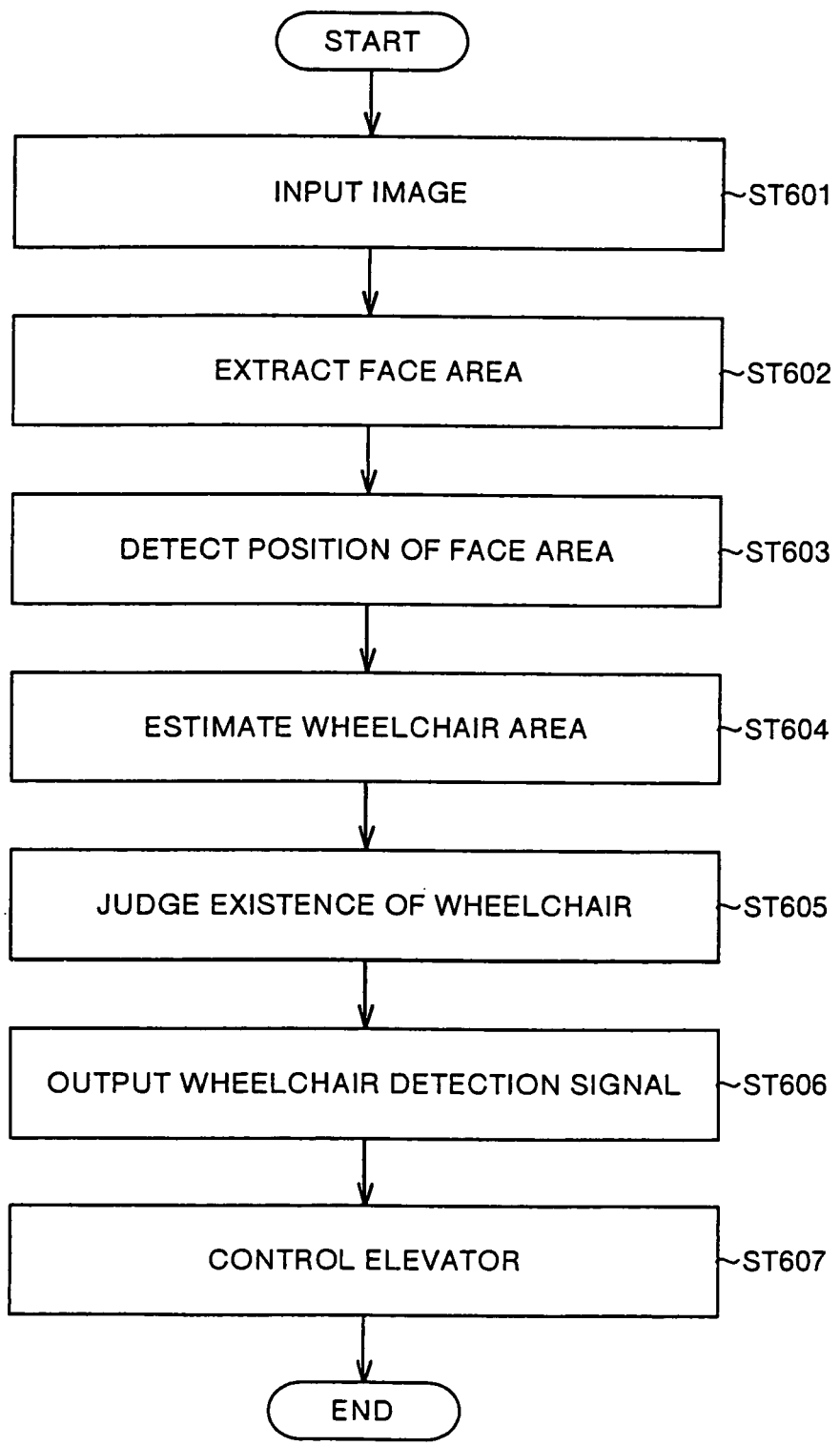
FIG. 15 is a flowchart which shows the operation flow of the image processing apparatus.

FIG. 14 is a block diagram which explains the configuration of an image processing apparatus according to this embodiment, and FIG. 15 is a flowchart which shows the operation flow of the image processing apparatus.

In these figures, reference numerals 11 to 15 are the same as those in the above embodiments, and 25 denotes an elevator control unit.

The wheelchair recognition signal 15 obtained by the image processing in the second to fifth embodiments is used and input to the elevator control unit as follows. The control operation includes the followings.

(a) opening/closing speed of the elevator door (the door is slowly opened for a wheelchair passenger), (b) opening time of the elevator door (when the passenger uses a wheelchair, the door is controlled so as to be opened for a longer period), (c) adjustment of the elevator floor (with regard to a control of a difference in step between the elevator car and the outside floor, the car is controlled so as to agree with the floor level more accurately when a wheelchair passenger gets on the elevator, to thereby eliminate the difference in level), (d) guidance by voice (voice announcement such as "The elevator is now operated in a barrier-free mode"), (e) elevator moving speed (when a wheelchair passenger is on, the maximum movement speed and acceleration of the elevator are decreased), (f) push button control inside the elevator (when a wheelchair passenger is on, a wheelchair dedicated button installed at a lower position in the car is made effective, and at other times, the button is made invalid, or it is made effective only when the button is pressed in a special manner, such as being pressed for a long time), and (g) control of a special sensor inside the elevator car (when a wheelchair passenger is on, a sensor dedicated to a physically handicapped person, such as voice recognition, installed in the car is made effective) By performing these controls, the operation of the elevator which gives priority to a wheelchair passenger can be performed, and it is thereby possible to increase the operation efficiency and provide comfortable operation conditions to passengers.

FIG. 14 of this embodiment mainly shows the configuration of the image processing apparatus explained in the second embodiment, but it is a matter of course that it may be the configuration of any image processing apparatus including the distance measurement unit shown in the third embodiment, the distance measurement control unit, the optical beam generation unit, the optical beam scanning unit and the reflected light detection unit shown in the fourth embodiment, or the distance measurement unit, the range gate setting unit, and the image pickup timing determination unit shown in the fifth embodiment.

INDUSTRIAL APPLICABILITY

The image processing apparatus according to this invention is used to automatically detect that a passenger using a wheelchair is included in passengers who are going to get on the elevator, or the like, and also used for control, such as changing the operation mode of the elevator in response to the detection.

The invention claimed is:

1. An image processing apparatus comprising:
an image pick up device which picks up an image of a person;
a face area extraction unit which extracts a first area including a person's face from an image picked up by the image pick up device;
a wheelchair area estimation unit in which a desired detection area is previously registered and which estimates the desired detection area using the first area extracted by the face area extraction unit to obtain an image in a second area; and
a wheelchair existence judgment unit which judges whether the image in the second area extracted by the detection area estimation unit coincides with a condition of the area previously registered.

2. An image processing apparatus comprising:
a TV camera installed to pick up an image of an outside of a compartment proximate a door which separates an inside of the compartment from the outside of the compartment;
a face area extraction unit which detects a position of a person's face area in the image picked-up by the TV camera;
a wheelchair area estimation unit which estimates a wheelchair area corresponding to an approximate position of a wheelchair and which uses the face area position detected when the person is assumed to be in a wheelchair; and
a wheelchair existence judgment unit which judges whether a wheelchair exists in the image from the wheelchair area estimated.

3. The image processing apparatus according to claim 2, further comprising a distance measurement unit which measures a distance to the face area extracted by the face area extraction unit, wherein the wheelchair area estimation unit estimates the wheelchair area using the measured distance data.

4. The image processing apparatus according to claim 3, wherein the distance measurement unit comprises:
an optical beam generation unit which generates a spot-like or slit-like optical beam;

an optical beam scanning unit which scans so that the optical beam generated is projected to an area to be measured; and a reflected light detection unit which detects reflected light of the optical beam, the distance measurement unit measuring a distance to an object based on a scanning angle of the optical beam and a position where the reflected light is detected.

5. The image processing apparatus according to claim 3, further comprising:

a range gate setting unit which sets a range threshold in order to judge when a person approaches an established range from the compartment; and an image pickup timing determination unit which determines timing at which an image is picked up, through recognition by the distance measurement unit, when the person comes into the established range, wherein an image is picked up by the TV camera according to the timing determined.

6. An elevator including image processing apparatus, the image processing apparatus comprising:

a TV camera installed to pick up an image of an outside of an elevator from proximate a door which separates the outside from an inside of the elevator;

a face area extraction unit which detects a position of a person's face area in the image picked-up by the TV camera;

a wheelchair area estimation unit which estimates a desired area corresponding to an approximate position of a wheelchair and which uses the face area position detected when the person is assumed to be in a wheelchair; and a wheelchair existence judgment unit which judges whether a wheelchair exists in the image from the wheelchair area estimated, wherein the TV camera photographs a passenger from proximate the door of the elevator, and information obtained by the wheelchair existence judgment unit is input into a control unit of the elevator.

* * * * *